United States Patent
Anderson et al.

(10) Patent No.: US 9,911,059 B1
(45) Date of Patent: Mar. 6, 2018

(54) PROCESS FOR RECOVERING AN UNMANNED VEHICLE

(71) Applicant: The United States of America as represented by the Secretary of the Air Force, Washington, DC (US)

(72) Inventors: Michael L. Anderson, Colorado Springs, CO (US); Charles B. Wilson, Sagle, ID (US); Michael A. Hyde, Santa Fe, NM (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 49 days.

(21) Appl. No.: 15/239,857

(22) Filed: Aug. 18, 2016

Related U.S. Application Data

(60) Provisional application No. 62/208,052, filed on Aug. 21, 2015.

(51) Int. Cl.
| | | |
|---|---|---|
| *G06K 9/00* | (2006.01) | |
| *G06K 9/46* | (2006.01) | |
| *G06F 3/0484* | (2013.01) | |
| *B64C 39/02* | (2006.01) | |
| *B64D 47/08* | (2006.01) | |

(Continued)

(52) U.S. Cl.
CPC .......... *G06K 9/4652* (2013.01); *B64C 39/024* (2013.01); *B64D 47/08* (2013.01); *G05D 1/0094* (2013.01); *G06F 3/04842* (2013.01); *B64C 2201/127* (2013.01); *B64C 2201/141* (2013.01); *B64C 2201/146* (2013.01); *B64C 2201/18* (2013.01); *H04N 5/225* (2013.01)

(58) Field of Classification Search
CPC ................ G06K 9/4652; B64C 39/024; B64C 2201/127; B64C 2201/141; B64C 2201/146; B64C 2201/18; B64D 47/08; G05D 1/0094; G06F 3/04842; H04N 5/225

See application file for complete search history.

(56) References Cited

U.S. PATENT DOCUMENTS

| | | | |
|---|---|---|---|
| 6,809,765 B1 * | 10/2004 | Tao | H04N 9/045 348/273 |
| 6,889,941 B1 | 5/2005 | McElreath et al. | |
| 7,410,125 B2 | 8/2008 | Steele | |

(Continued)

*Primary Examiner* — Shefali Goradia
(74) *Attorney, Agent, or Firm* — AFMCLO/JAZ; Jason Sopko

(57) ABSTRACT

A process for recovering a vehicle includes obtaining a red green blue (RGB) image comprising a target on a recovery device. An input received from a user designates a target hue value and a target luminance value. The RGB image is converted to a hue value saturation (HSV) color model. The HSV color model is split into a hue value plane and a luminance value plane. A hue band pass filter and a luminance band pass filter are configured with appropriate thresholds. The configured hue band pass filter and the luminance band pass filter are applied to the hue value plane and the luminance value plane, respectively. The filtered hue value plane and the filtered luminance value planes are combined to yield a plurality of potential target pixel groupings. The most probable target is determined from the plurality of potential target pixels. The vehicle is directed to the target.

11 Claims, 2 Drawing Sheets

(51) Int. Cl.
*G05D 1/00* (2006.01)
*H04N 5/225* (2006.01)

(56) References Cited

U.S. PATENT DOCUMENTS

| | | | |
|---|---|---|---|
| 7,768,671 B2* | 8/2010 | Bala | H04N 1/6058 |
| | | | 358/1.9 |
| 8,172,177 B2 | 5/2012 | Lovell et al. | |
| 8,178,825 B2 | 5/2012 | Goossen et al. | |
| 8,471,186 B2 | 6/2013 | Wallis | |
| 8,543,265 B2 | 9/2013 | Ekhaguere et al. | |
| 8,783,607 B2 | 7/2014 | Allen et al. | |
| 8,833,288 B2* | 9/2014 | Bertelsen | B63G 8/001 |
| | | | 114/312 |

* cited by examiner

PROCESS FOR RECOVERING AN UNMANNED VEHICLE

Pursuant to 37 C.F.R. § 1.78(a)(4), this application claims the benefit of and priority to prior filed Provisional Application Ser. No. 62/208,052, filed Aug. 21, 2015, which is expressly incorporated herein by reference.

RIGHTS OF THE GOVERNMENT

The invention described herein may be manufactured and used by or for the Government of the United States for all governmental purposes without the payment of any royalty.

FIELD OF THE INVENTION

Embodiments of the present invention relate to systems and methods for recovering an unmanned vehicle, and more particularly toward automated recovery of an unmanned aerial vehicle (UAV).

BACKGROUND OF THE INVENTION

Unmanned aerial vehicles (UAV) include remotely piloted aircraft (RPA) or self-piloted aircraft (SPA) that can carry cameras, sensors, communication equipment, or other payloads, and are capable of controlled, sustained, level flight, and are usually powered by an engine. A self-piloted UAV or SPA may fly autonomously based on pre-programmed flight plans. UAVs are becoming increasingly used for various missions where manned flight vehicles may provide sub-optimal results. These missions may include military applications, such as surveillance, reconnaissance, target acquisition, data acquisition, communications relay, decoy, harassment, or supply flights.

However, UAVs are not solely used for military applications. A growing number of civilian applications are now being implemented, such as firefighting, natural disaster reconnaissance, police observation of civil disturbances or crime scenes, and scientific research (e.g., observation of weather formations or volcanos).

And as their versatility grows, new applications arise, which in turn demand further innovation. For example, if a UAV must land or be recovered by a moving vehicle, the three dimensional dynamics of that moving vehicle will significantly complicate the landing procedure. Highly trained operators are often required to execute such a recovery, and depending on the agility of the moving terrestrial or maritime vehicle, the difficulty of the landing may exceed the skill of the operator. Given the increasing cost and sophistication of many UAVs, failed recovery attempts will invariably be dangerous and expensive.

Accordingly, there is an unmet need in the art for improved systems and methods for navigating UAVs, especially for automating recovery of UAVs.

SUMMARY OF THE INVENTION

In accordance with and embodiment of the disclose invention, a process for recovering a vehicle is provided. The process includes obtaining a red green blue (RGB) image comprising a target on a recovery device. The RGB image is obtained from a camera operably coupled to the vehicle. An input received from a user designates a target hue value and a target luminance value. The RGB image is converted to a hue value saturation (HSV) color model. The HSV color model is split into a hue value plane and a luminance value plane. A hue band pass filter and a luminance band pass filter are configured with a hue threshold and a luminance threshold, respectively. The configured hue band pass filter and the luminance band pass filter are applied to the hue value plane and the luminance value plane, respectively. The filtered hue value plane and the filtered luminance value planes are combined to yield a plurality of potential target pixel groupings. The most probable target is determined from the plurality of potential target pixels. The vehicle is directed to the center of the most probable target.

Additional objects, advantages, and novel features of the invention will be set forth in part in the description and drawings which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the invention and, together with the summary given above, and the detailed description given below, serve to explain the invention.

DETAILED DESCRIPTION OF THE INVENTION

In the discussion that follows, the terms UAV, RPA, and SPA may be used to describe embodiments of the disclosed invention. While it is understood that each term describes a distinct category of aircraft having different capabilities and features, the disclosed invention may be applied to each type.

One purpose of the system and method disclosed herein is to automatically guide any unmanned vehicle, such as an unmanned aerial vehicle (UAV), into a recovery device to safely capture the unmanned vehicle at the completion of a task or mission. As used herein, the terms "recover" or "capture" shall relate to any means for safely stopping a moving vehicle and bringing it into possession of an operator. An exemplary implementation of the system and method disclosed herein may be used by ships at sea to recover remotely piloted aircraft (RPA). It will be recognized by one of ordinary skill in the art that the system and method also may be applied to other applications in which it is necessary to recover an unmanned vehicle, whether on the ground, in the air, or under water.

Commercial fishing vessels may utilize UAVs such as RPAs to scan for schools of fish. Using present technology, at the end of a task, a skilled RPA operator uses a radio transmitter to send flight control commands to the RPA to fly it into a recovery device, such as a recovery net, or arresting cable device. Skilled RPA operators require extensive training and experience to perform their jobs successfully. Other guidance methods, such as Global Position System (GPS) or Inertial Measurement Unit (IMU) sensor-based navigation are not precise enough, or fast enough, to successfully recover a RPA at sea.

One advantage of the system and methods disclosed herein is that a skilled RPA operator is not required, and the system and methods are more reliable than an operator-guided recovery. As such, the system and methods disclosed herein will reduce the instances of RPA crashes which may cause substantial damage to the RPA and the ship, as well as pose a safety hazard to personnel.

Figure 1A:
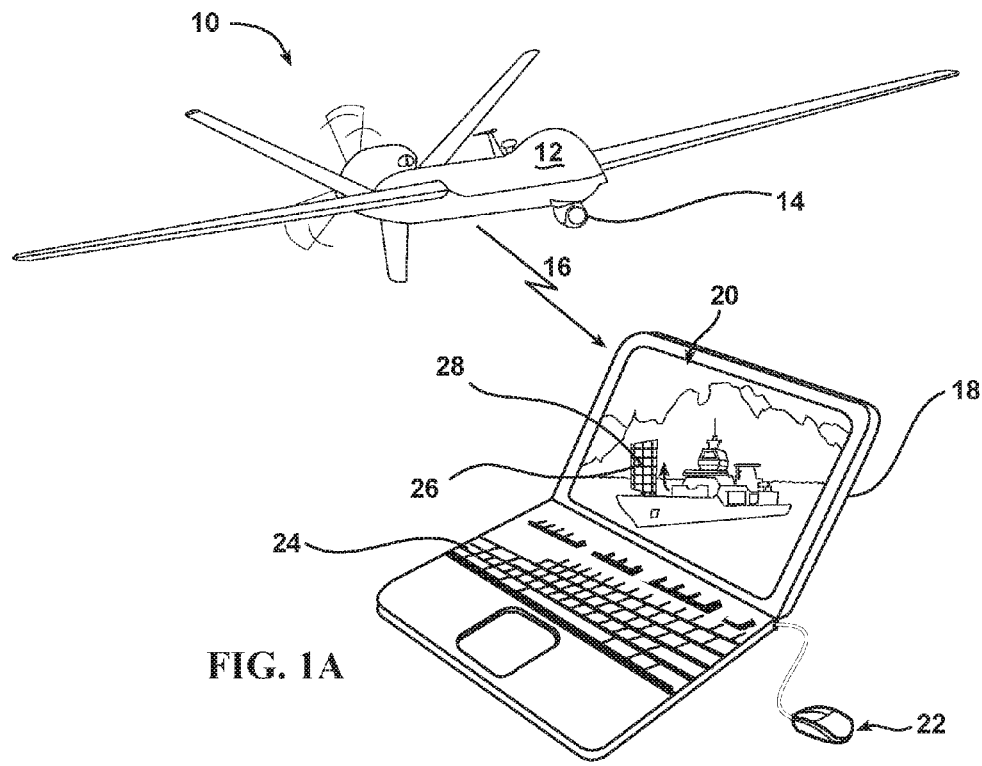
FIGS. 1A and 1B depict exemplary hardware configurations for use with the disclosed method for recovering an unmanned aerial vehicle into a recovery device, in accordance with embodiments of the present invention.
Figure 1B:
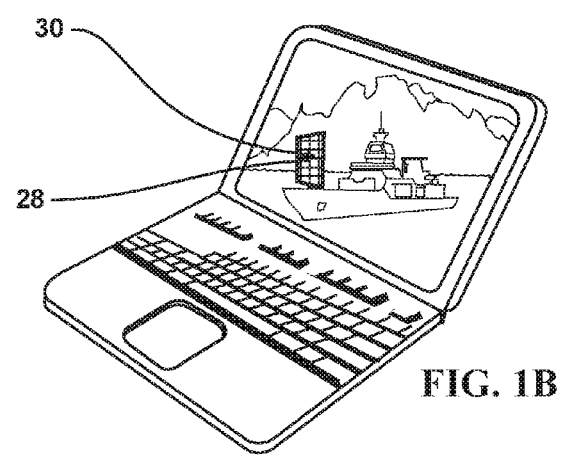
Figure 2:
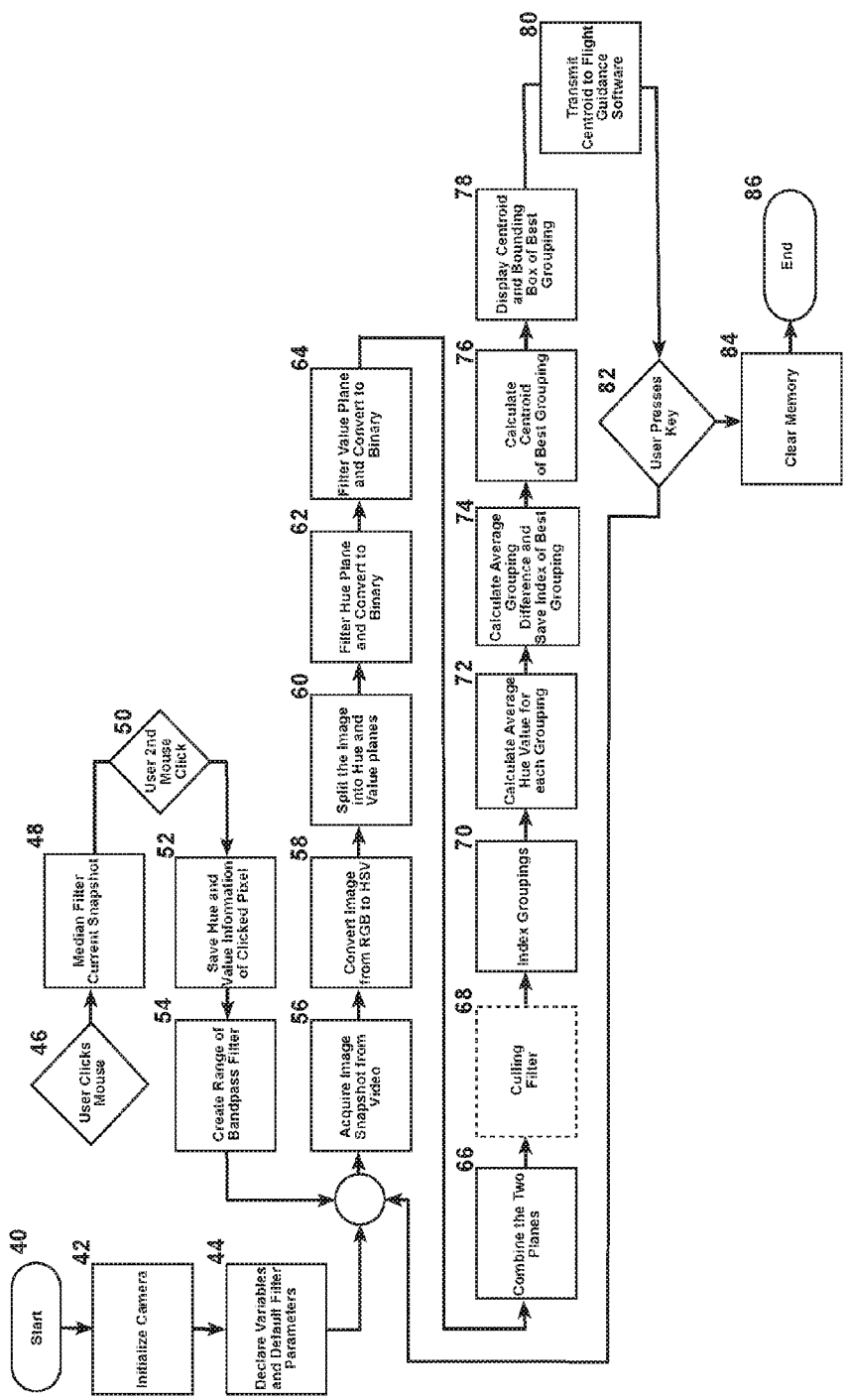
FIG. 2 is a graphical representation of a software module utilized in a system and method for recovering an unmanned vehicle into a recovery device, in accordance with an embodiment of the present invention.

Turning attention to FIGS. 1A and 1B, the disclosed method utilizes an onboard video camera 14 and employs an autopilot feature of the RPA 12, which is configured to steer the aircraft toward an on-screen coordinate. The RPA sends a live video feed (via wireless link 16) to a control station 18 having a display 20, mouse 22, and keyboard 24 on the ship. When the object tracking program is executed, this live feed is shown on the display 20. An algorithm immediately begins tracking an object according to default parameters. By way of example, a bucket, basket, or net 26 (all of which may be referred to as a recovery device or target) may be uniquely colored so as to possess optical characteristics defined by the default parameters. These default parameters may be changed at any point during the final approach of the RPA by the user. To change them, the user simply selects a desired pixel 28 in the display 20 window. The algorithm finds the object which best matches the parameters of the pixels selected by the user and calculates the coordinates of that object's centroid. A bounding box 28 and target cross hairs 30 are superimposed on the perceived net 26 target. These coordinates are transformed into the aircraft's body-fixed coordinate system, and range, bearing and azimuth are sent to the RPA which uses its autopilot to home in on the target. These coordinates are generated for each individual video frame and continuously sent to the RPA. The feedback loop ends when the user terminates the program.

The disclosed system is unique for several reasons: 1) It utilizes the video camera on board the RPA to provide a "first-person-view" of the target (the recovery device); 2) The view of the target is transmitted to the ground control station which computes the target's location, the RPA's location relative to the target, and sends commands to steer the RPA into the target; 3) The RPA's position relative to the recovery device is calculated in near-real-time to enable the RPA to receive timely commands for a successful recovery; 4) This method is designed for RPA recovery at sea, and is thus capable of tracking a moving target; 5) The optical tracking method is highly robust to varying lighting conditions; 6) The system allows the user/RPA operator to select a pixel, or groups of pixels for the system to track, and can change the selection in real time to improve the system's reliability in identifying the correct target; 7) The system allows the users to set thresholds for numerous image recognition parameters to improve the system's target recognition reliability; and 8) The system uses distinctive visual features of a recovery device to improve target recognition.

One embodiment of the disclosed invention includes a) a ship as the recovery vessel, b) a recovery net secured to the ship, c) distinctive visual features on the net (such as bright colors), d) an unmanned air vehicle (UAV) with a zooming video camera, e) a ground control station (GCS) to process images and send flight commands, f) highly robust and efficient image processing software to recognize and track a target, and g) software to transform the target location into flight control commands. While current embodiments include a Ground Control Station, this configuration is selected to relocate some of the more computationally complex operations off of the UAV. When the control station is located on the ground, for all practical purposes, factors such as weight, volume, and power requirements are irrelevant. If required, certain steps disclosed herein as being performed on the ground, could be performed onboard the UAV.

The automated UAV recovery may be performed as follows: The UAV is guided with GPS waypoints to approach the ship to within approximately 100 m off the side of the ship. Meanwhile, the UAV's onboard video camera captures images which are sent to the GCS onboard the recovery ship. When the object tracking program is executed, this live feed is displayed on-screen. An algorithm, as further discussed below, immediately begins tracking an object according to default object recognition parameters. These object recognition parameters may be changed at any point during the final approach of the UAV by the user. To change them, the user simply selects the desired pixel in the display window. The algorithm finds the object which best matches the parameters selected by the user and calculates the coordinates of that object's centroid. These centroid coordinates are transformed into the aircraft's body-fixed coordinate system, and range, bearing and azimuth are sent to the UAV by the GCS. The UAV then uses its on-board autopilot to home in on the target. These coordinates are generated for each individual video frame and continuously sent to the UAV. The feedback loop ends when the user terminates the program.

The image processing software enhances the system and method, and is unique as a result of its simplicity and high efficiency. This allows it to operate very quickly and robustly to identify the correct target, and to do so fast enough to allow the RPA to correct its flight path in time to make the recovery. MATLAB® was selected as the software to prototype embodiments of the disclosed invention because it is particularly fast at manipulating matrices and has a robust image processing suite. Other software tools and languages may be used with acceptable results. The software script provides the coordinates which the RPA's autopilot homes in on. The algorithm includes a live video feed and input from a user. Until the user provides input, the algorithm will track a preselected color. The algorithm begins with an initialization phase (Start 40); capturing the video input from the RPA (Initialize Camera 42), setting variables (Declare Variables and Default Filter Parameters 44), and setting callback functions (an interrupt that awaits User Clicks Mouse 46). These callback functions (denoted by the diamonds in the flowchart) allow the user to select new tracking parameters or exit the program by either clicking the mouse over the figure window or pressing a keyboard key, respectively. The preset color parameters may also be set in this initialization phase of the code.

The click callback is a desirable aspect to the operation of the algorithm and requires an affirmative user input before the RPA attempts to acquire and track the target (recovery device). If this affirmative user input was not required, the algorithm could track a default hardcoded hue that may be incorrect. For example, the hardcoded hue represented by a default variable, could be incorrect due to varying ambient lighting conditions, which could cause the computer to assign different quantifiers to the same color. The simple user input allows the system to compensate for these variations in ambient lighting.

When the user first clicks on the video figure window (User Clicks Mouse 46), the callback function begins, the video pauses (Median Filter Current Snapshot 48), and crosshairs appear. A second click (User Second Mouse Click 50) saves the coordinates of the cursor at the instant the mouse was second-clicked. Next, the current Red Green Blue (RGB) video frame is converted to Hue Value Saturation (HSV) and filtered (Save Hue and Value Information of Clicked Pixel 52). An adjacent pixel averaging filter averages the hue values of neighboring pixels. This adds robustness by decreasing the likelihood that the user accidently selects a pixel within the target with a hue value not representative of the target's average hue. In some embodiments of the disclosed invention, the radius of neighboring averaged pixel is user configurable.

Next, the callback function creates the width of a band pass filter (Create Range of Bandpass Filter 54). This width is hard-coded, but in testing a range of 14% for hues and 20% for values (luminance) was found to produce acceptable results. If the range was smaller, the band pass filter might delete parts of the target. At greater widths, the filtering may yield too many possible targets. In some embodiments, the width may be configured by a user.

In the case of the hue values, it is advantageous to wrap this filter range around 0 or 1. Wrapping is preferred because reddish hues are represented by both very low values (0.0 to 0.1 representing orange reds) and very high values (0.9 to 1.0 representing pink reds). If the high end of the hue range is above 1, the algorithm subtracts 1 resulting in a low hue value. If the low end of the range is below 0, the algorithm adds 1, resulting in a high value. For example, if the user selects a pixel with a hue of 0 (red), the range created for the filter would be [−0.93, 0.07]. The IF statement would change this range to [0.93, 0.07].

For luminance, the callback creates a filter in a similar fashion to that for the hue values. But the filter does not need to wrap the range around 0 or 1, because a value of 1 is very bright while a value of 0 is very dark. When the callback function ends, the algorithm returns to the main function.

The main function includes a loop which runs until a key is pressed. First, the video frame acquired (Acquire Image Snapshot from Video 56) is converted from the RGB to the HSV color model (Convert Image from RGB to HSV 58). If the system attempted to perform calculations in an RGB color space, it would require the algorithm to filter all three image planes (red, green, and blue), which requires excessive processing that slows down the system (rendering it infeasible for RPA recovery at sea). HSV was chosen because hue offered a color measure which does not change with lighting conditions. The original RGB image is saved for display later. The HSV image is split into two planes comprising hue and value (representing luminance) (Split the Image into Hue and Value Planes 60). The hue plane is saved twice, once for immediate processing and to another variable for later comparison. Value (luminance) was chosen instead of saturation because it allows greater differentiation between colors.

Next, the algorithm applies a band pass filter to both the hue and value plane (Filter Hue Plane and Convert to Binary 62 and Filter Value Plane and Convert to Binary 64). This eliminates all objects that are sufficiently different from the target and thus do not warrant further consideration. Depending on the thresholds selected, approximately 86% of all hues and 80% of all values are eliminated in this process. Not only does the filter eliminate unwanted hues and values, it also converts the images to binary. The two planes are then recombined so only pixels which fell into both the acceptable hue and acceptable value range are saved (Combine the Two Planes 66). This yields a single binary image with pixels of interest represented as 1s. If the range created when the user selects a pixel (as in the previous example) wraps around 0 or 1, the program ensures that all pixels above the highest hue (0.93 in the case of the example) and all pixels below the lowest hue (0.07 in the case of the example) are still saved. To eliminate noise, a culling filter is applied (Culling Filter 68), which deletes any group of pixels smaller than a configured threshold (one hundred, in the case of the embodiment tested here). This value threshold can be changed depending on the noise of the environment and the distance from the RPA to the target. A smaller value extends the range but increases the risk of identifying erroneous targets.

Although each grouping of pixels remaining represents a color object very similar in color to the object selected by the user, there can only be one target designated as the recovery location of the UAV. To determine which pixel grouping is the best candidate for being the true target, the algorithm computes each grouping's average hue value and compares it to the hue (and average of the pixels adjacent the selected pixel) selected by the user. Each grouping is indexed and the coordinates of the pixels within each grouping are stored temporarily (Index Groupings 70). For each distinct grouping, the algorithm retrieves the hue values from the second hue plane matrix saved at the top of the loop and averages them (Calculate Average Hue Value for each Grouping 72). The difference between this average and the hue selected by the user is computed and saved until a smaller difference is computed (Calculate Average Grouping Difference and Save Index of Best Grouping 74). Each time a smaller difference is computed the algorithm saves the index of the grouping associated with the smallest difference. This loop iterates until all groupings have been analyzed. As noted above, it is desirable to apply the Hue and Value band pass filters (executed in steps 62 and 64) to limit the number of groupings because analyzing an excessive number of candidates significantly slows the algorithm's execution. The fewer groupings that need to be characterized, the faster the program runs and outputs coordinates to the RPA. All of these computational efficiencies are conducive to ensuring faster operation of the algorithm, which in turn improves the ability of the RPA to track and guide into the moving ship-borne recovery device.

A centroid and a bounding box are then computed using the coordinates of the pixels within the best grouping (Calculate Centroid of Best Grouping 76). These coordinates and bounding box are displayed over the RGB image (Acquire Image Snapshot from Video 56) saved at the top of the loop (Display Centroid and Bounding Box of Best Grouping 78). These coordinates of the target on the image plane are then transformed to a relative location from the RPA. The guidance software then accounts for any latency based on the time stamp of the last received data, and the estimated current RPA location, then determines the appropriate bearing and azimuth the RPA should fly to steer into the recovery device. These are sent to the RPA via the secure wireless communication link (Transmit Centroid to Flight Guidance Software 80). The RPA's onboard autopilot converts the designated bearing and azimuth to flight control commands which are executed by the RPA to steer into the recovery device. The algorithm then acquires a new video frame and the process begins again. The routine is terminated when the user presses a key 82 on the keyboard 24 or other dedicated input device. The memory is cleared 84 and the routine ends 86.

Of particular note, the disclosed computer software and flight control process does not require highly specific aircraft hardware, so it may be applied to numerous UAV variants. For optimal results, the recovery device should include distinctive visual features to improve target recognition, but these distinctive visual features can be applied to existing recovery systems. By way of example, a contrasting hue, one not likely to be encountered in the native operating environment (fluorescent green), may be presented behind a neutral colored net. Alternatively, a distinctly colored solid fabric panel may be incorporated in the center of the recovery net. In any event, retrofitting existing recovery apparatus for use with the disclosed invention is a low cost and low effort endeavor.

While the present invention has been illustrated by the description of one or more embodiments thereof, and while the embodiments have been described in considerable detail, they are not intended to restrict or in any way limit the scope of the appended claim to such detail. Additional advantages and modification will be readily apparent to those skilled in the art. For example, embodiments of this invention could be used in any application where it is beneficial to quickly and efficiently identify an object that appears in an image. Therefore, it is foreseeable to implement it in any of the following applications: law enforcement to search for suspicious persons or objects, driverless cars to identify obstacles or landmarks, assistive technology for disabled people, defensive military operations to recognize threat aircraft, automated aircraft refueling operations, victim and/or threat identification in search and rescue operations, autonomous navigation of robotic systems, etc. Additionally, the invention in its broader aspects is therefore not limited to the specific details, representative apparatus and methods and illustrative examples shown and described. Accordingly, departures may be made from such details without departing from the scope or the spirit of the general inventive concept exemplified herein.

What is claimed is:

1. A process for recovering a vehicle, comprising:
    obtaining a red green blue (RGB) image comprising a target on a recovery device, wherein the RGB image is obtained from a camera operably coupled to the vehicle;
    receiving an input from a user designating a target hue value and a target luminance value;
    converting the RGB image to a hue value saturation (HSV) color model;
    splitting the HSV color model into a hue value plane and a luminance value plane;
    configuring a hue band pass filter and a luminance band pass filter with a hue threshold and a luminance threshold, respectively, wherein the configured hue band pass filter and the luminance band pass filter are applied to the hue value plane and the luminance value plane, respectively;
    combining the filtered hue value plane and the filtered luminance value planes to yield a plurality of potential target pixel groupings;
    determining the most probable target from the plurality of potential target pixels;
    and directing the vehicle to the center of said most probable target.

2. The process of claim 1, further including the step of configuring a culling filter with a threshold minimum number of grouped pixels;
    applying the culling filter to the plurality of potential target pixel groupings; and
    excluding some of the plurality of potential target pixel groupings having fewer elements than the threshold minimum.

3. The process of claim 1, wherein directing the vehicle to the center of said most probable target includes calculating a centroid of the most probable target;
    using a vehicle-centric coordinate system to establish a bearing and an azimuth with respect to the centroid; and
    instructing a vehicle autopilot to command the vehicle to perform maneuvers to travel along the bearing and the azimuth.

4. The process of claim 3, wherein directing the vehicle to the center of said most probably target further includes, displaying a crosshair representing the centroid, and a bounding box representing the most probable target, on a display, to a user for confirmation.

5. The process of claim 1, wherein the hue band pass filter is configured with a threshold selected from the range of approximately 10% to approximately 20%.

6. The process of claim 5 wherein the hue band pass filter wraps around hue values of 0 or 1 to capture both red-pink hues and red-orange hues.

7. The process of claim 5, wherein the hue band pass filter is configured with a threshold of approximately 14%.

8. The process of claim 1, wherein the luminance band pass filter is configured with a threshold selected from the range of approximately 10% to approximately 30%.

9. The process of claim 8, wherein the luminance band pass filter is configured with a threshold of approximately 20%.

10. The process of claim 1, wherein receiving an input from a user designating a target hue value and a target luminance value, comprises the user clicking a desired target pixel on a display.

11. The process of claim 1, wherein receiving an input from a user designating a target hue value and a target luminance value, further includes applying an adjacent pixel averaging filter to reduce the risk of mischaracterizing the hue value or the luminance value by clicking on an anomalous pixel.

* * * * *